(12) United States Patent
Kováč

(10) Patent No.: US 10,909,179 B2
(45) Date of Patent: Feb. 2, 2021

(54) MALWARE LABEL INFERENCE AND VISUALIZATION IN A LARGE MULTIGRAPH

(71) Applicant: Avast Software s.r.o., Prague (CZ)

(72) Inventor: Peter Kováč, Prague (CZ)

(73) Assignee: Avast Software s.r.o., Prague (CZ)

( * ) Notice: Subject to any disclaimer, the term of this patent is extended or adjusted under 35 U.S.C. 154(b) by 159 days.

(21) Appl. No.: 15/941,668

(22) Filed: Mar. 30, 2018

(65) Prior Publication Data

US 2018/0293330 A1 Oct. 11, 2018

Related U.S. Application Data

(60) Provisional application No. 62/479,124, filed on Mar. 30, 2017.

(51) Int. Cl.
| | | |
|---|---|---|
| *G06F 16/901* | (2019.01) | |
| *G06F 17/11* | (2006.01) | |
| *G06F 21/56* | (2013.01) | |
| *G06F 21/55* | (2013.01) | |

(52) U.S. Cl.
CPC .......... *G06F 16/9024* (2019.01); *G06F 17/11* (2013.01); *G06F 21/552* (2013.01); *G06F 21/56* (2013.01); *G06F 21/566* (2013.01)

(58) Field of Classification Search
CPC ................................................. G06F 16/9024
See application file for complete search history.

(56) References Cited

U.S. PATENT DOCUMENTS

| | | | |
|---|---|---|---|
| 8,701,190 B1 | 4/2014 | Chau et al. | |
| 8,799,190 B2 | 8/2014 | Stokes et al. | |
| 10,331,706 B1* | 6/2019 | Yakhnenko | ........... G06F 16/288 |
| 2016/0203130 A1* | 7/2016 | Roque | ..................... G06F 16/93 |
| | | | 707/741 |
| 2016/0248794 A1* | 8/2016 | Cam | ................... H04L 63/1433 |

FOREIGN PATENT DOCUMENTS

JP 2011028454 A * 2/2011

OTHER PUBLICATIONS

Belief propagation, Wikipedia article, Mar. 10, 2017, 5 pages, https://web.archive.org/web/20170324022720/https://en.wikipedia.org/wiki/Belief_propagation. Accessed Aug. 2, 2018.

Chau et al., Polonium: Tera-Scale Graph Mining for Malware Detection, Knowledge Discovery and Data Mining—Large Scale Data Mining: Theory and Applications '10, Jul. 25, 2010, 8 pages, Washington, D.C.

Venzhega et al., Graph-based Malware Distributors Detection, WWW 2013 Companion, May 13-17, 2013, pp. 1141-1144, Rio de Janeiro, Brazil.

Alabdulmohsin et al., Content-Agnostic Malware Detection in Heterogeneous Malicious Distribution Graph, Conference on Information and Knowledge Management '16, Oct. 24-28, 2016, pp. 2395-2400, Indianapolis, Indiana.

\* cited by examiner

*Primary Examiner* — Dawaune A Conyers
(74) *Attorney, Agent, or Firm* — Erickson Kernell IP, LLC (57) ABSTRACT

Analyzing a large number of files to identify malicious software including evaluating a multigraph including determining a graph having a plurality of nodes, including a source node and target nodes from a data set and merging the graph into a multigraph in response to a node score above a threshold level, for each target node; determining one or more specificity indexes for target node and determining a node score for the target node based, at least in part, on a specificity index.

9 Claims, 6 Drawing Sheets

MALWARE LABEL INFERENCE AND VISUALIZATION IN A LARGE MULTIGRAPH

CROSS-REFERENCE TO RELATED APPLICATIONS

This application claims priority to U.S. Provisional Patent Application Ser. No. 62/479,124, filed on Mar. 30, 2017, entitled "Malware Label Inference and Visualization in a Large Multigraph," the entire disclosure of which is incorporated herein by reference.

FIELD

The disclosure relates generally to anti-malware systems, and more particularly, to determining malware labels and visualization of a large multigraph showing malware candidates.

BACKGROUND

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware etc. Today there is rarely just one malicious file involved in the process of infecting a computer. Usually a (possibly) long chain of events happens before the malware has done its job. Correctly identifying where the chain starts and which parts of it belong to malware and which are benign is a difficult task, especially for polymorphic viruses that change their behavior, structure, or both. Further, the number of files and events that can be involved in the analysis can be in the millions or tens of millions. Analyzing such a large number of files and events using conventional methods can be impractical given the resources and time required to undertake such an analysis.

BRIEF DESCRIPTION OF THE DRAWINGS

For a better understanding of the inventive subject matter, reference may be made to the accompanying drawings in which.

DETAILED DESCRIPTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
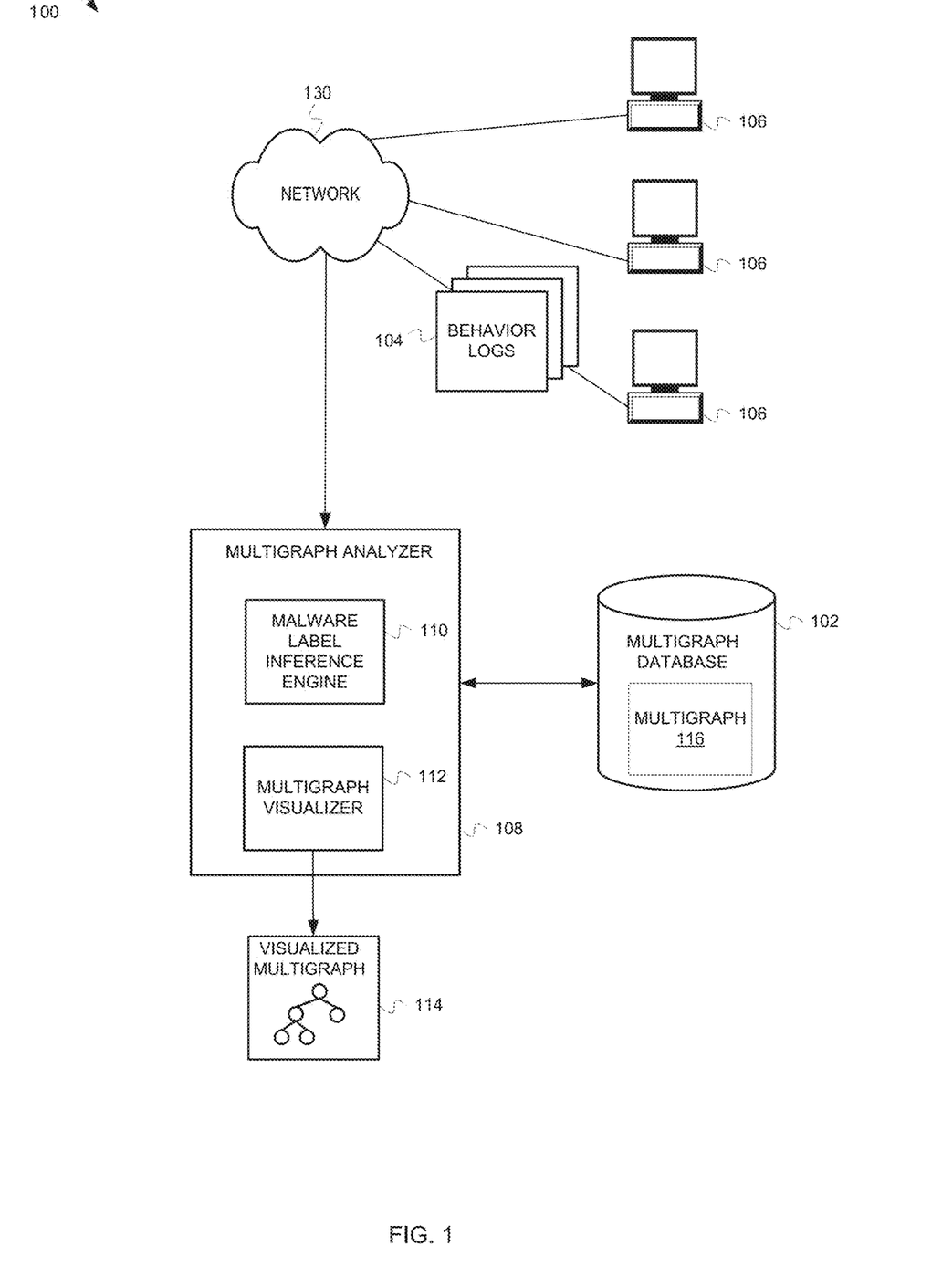
FIG. 1 is a block diagram of illustrating components of an operating environment of a system for determining malware labels and visualization in a large multigraph.

FIG. 1 is a block diagram of illustrating components of an operating environment 100 of a system for determining malware labels and visualization in a large multigraph. In some embodiments, operating environment 100 includes client computers 106, and a multigraph analyzer 108 coupled via a network 130. Network 130 can be the Internet, an intranet, a local area network, or any other type of wired and/or wireless communications network.

Computer 106 can be any type of computing device, including desktop computers, laptop computers, mainframe computers, tablet computers, smartphones, set top boxes, Internet of Things devices, or any other device with a processor, memory and network interface.

During operation, a computer 106 can produce a behavior log 104. A behavior log 104 can be a system snapshot that is taken when a behavior monitor (e.g., anti-malware software, not shown) determines a potentially malicious event has occurred. The snapshot in the behavior log 104 can include a directed graph where nodes correspond to either files on disk or processes in memory. Edges represent relations between nodes, which can be an action that took place on the computer 106 (e.g., "write to disk" when a process writes a file to disk or "instance of" when a process was created by executing some file). The behavior log 104 can be transmitted to multigraph analyzer 108 via network 130.

Multigraph analyzer 108 can receive the behavior logs of multiple computers 106, and incorporate the information received from the computers 106 into a multigraph database 102. For example, multigraph analyzer 108 can receive one or more behavior logs, and merge one or more directed graphs from the one or more behavior logs into a single, large directed graph, referred to as a multigraph 116, that represents the merger of multiple directed graphs received from multiple computers 106 over time. In some embodiments, the multigraph 116 can be implemented using an "adjacency list" approach, where nodes are stored in one array and edges in another. However, such an approach is not required, and other graph implementation methods now known or developed in the future may be used. In some embodiments, metadata about nodes and edges can include source graph information. In such embodiments, each node and edge knows to which graph (e.g., which behavior log) it originally belonged. Further, in some embodiments, nodes that are very similar to other nodes from different graphs can be merged into super nodes (while still keeping a list of original graphs the node belonged to). This can greatly reduce the number of nodes in multigraph 116 since system files (e.g., operating system binaries) can typically be very similar across computers 106. A typical multigraph 116 can include hundreds of thousands of source graphs in one multigraph 116, typically resulting in anywhere from tens to hundreds of millions of nodes and edges all in one instance of the multigraph database 102.

Multigraph analyzer 108 can include a malware label inference engine 110 and a multigraph visualizer 112. Malware label inference engine 110 can analyze a multigraph 116 and make inferences about the nodes in the multigraph 116. In particular, malware label inference engine 110 can make inferences regarding whether a node or series of nodes represent malware, based on attributes of other nodes in the multigraph 116 that are known to represent malware.

Multigraph visualizer 112 can analyze multigraph 116, and can produce a visualized multigraph 114 based on the analysis.

Figure 2:
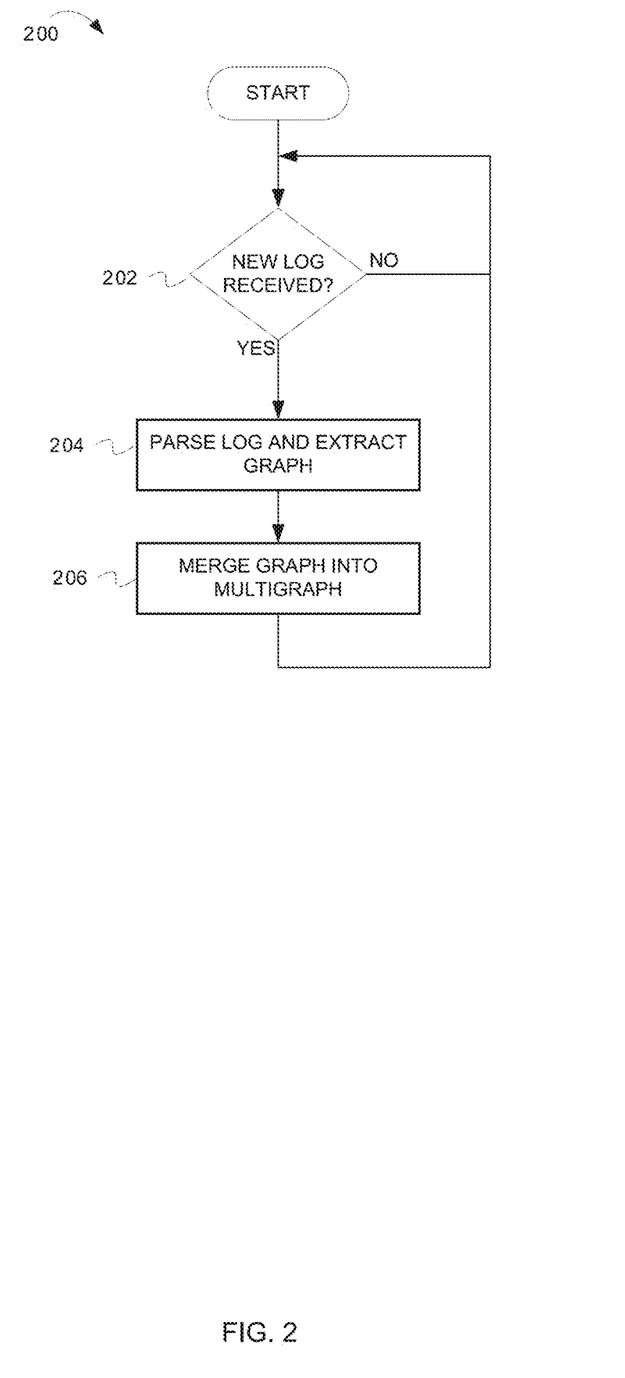
FIG. 2 is a flow chart illustrating operations of a method for creating and maintaining a multigraph.
Figure 3:
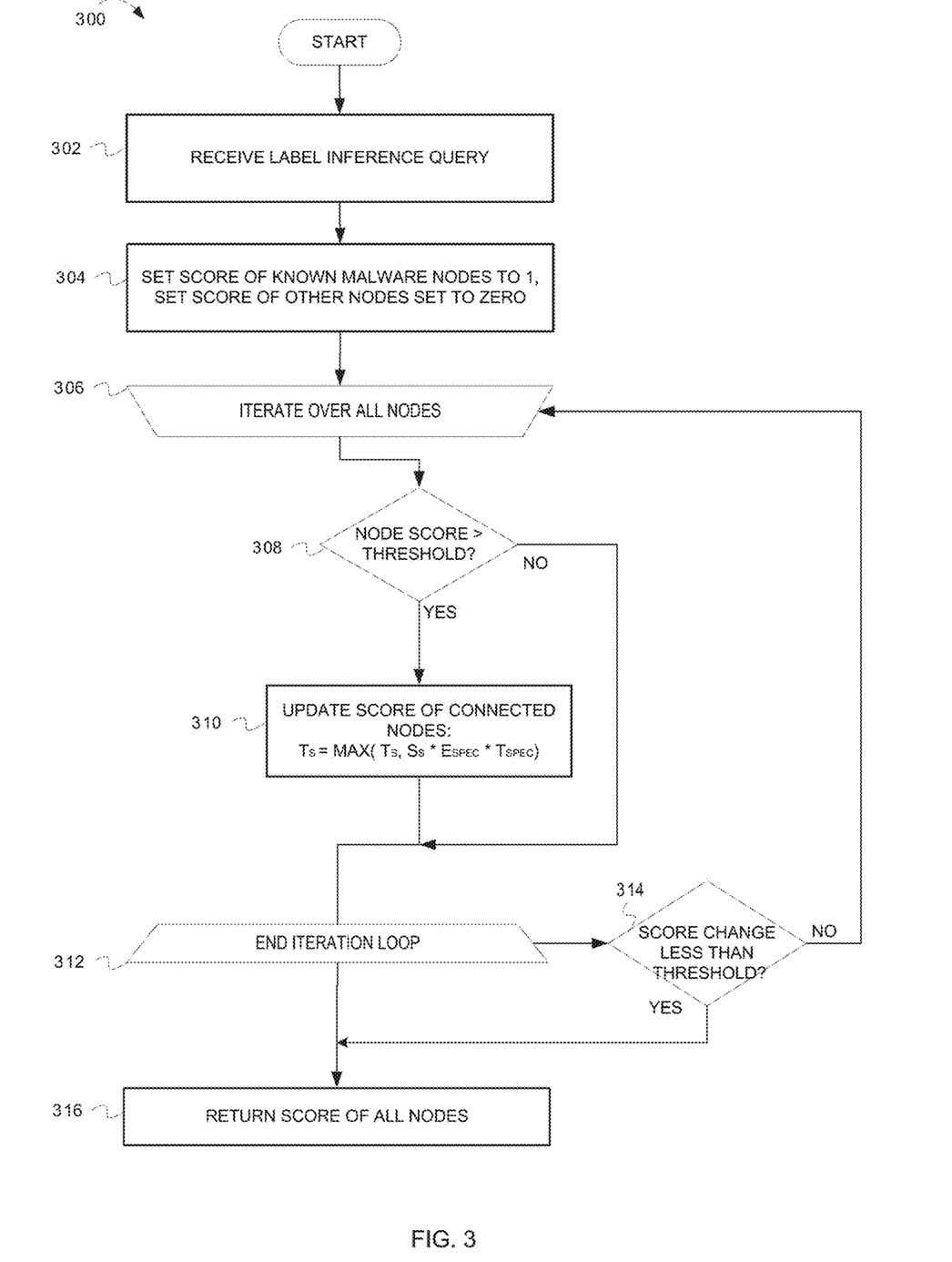
FIG. 3 is a flow chart illustrating operations of a method for inferring malware labels and in a multigraph.
Figure 4:
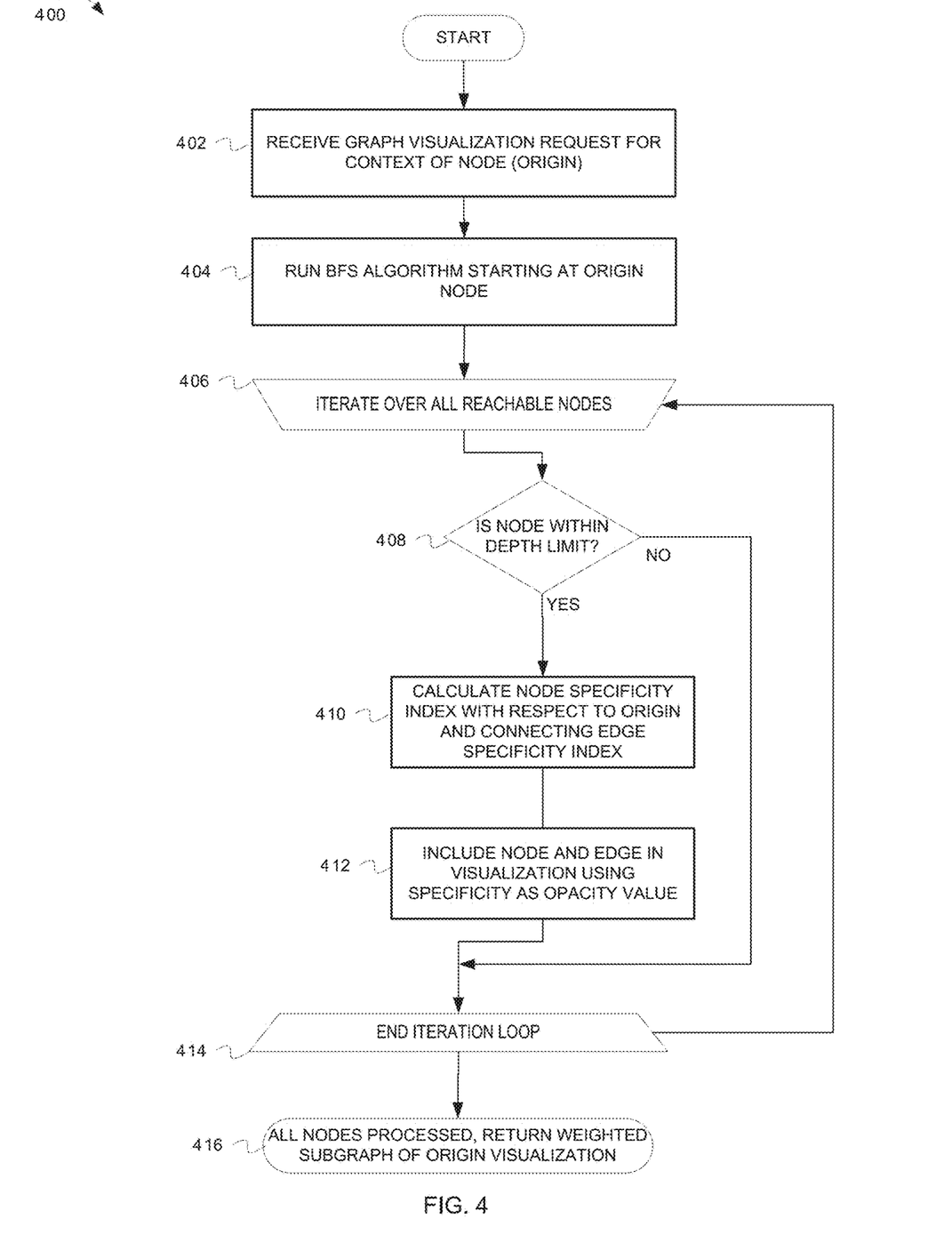
FIG. 4 is a flow chart illustrating operations of a method for creating a visualization of a large multigraph having malware labels.

Further details on the operation of multigraph analyzer 108 will now be provided with reference to FIGS. 2, 3, and 4.

FIG. 2 is a flow chart 200 illustrating operations of a method for creating and maintaining a multigraph 116. At decision block 202 a system executing the method, e.g., multigraph analyzer 108, determines if a new behavior log 104 has been received. If not, the method continues to periodically check for a new behavior log 104. If a new behavior log is received, the method continues at block 204.

At block 204, the behavior log 104 is parsed, and a directed graph is extracted from the behavior log 104.

At block 206, the directed graph from the behavior log 104 is merged into a multigraph 116. Various merging mechanisms can be used. For example, in some embodiments, when merging a new graph into the multigraph, all the nodes and edges of the new graph can be added to the multigraph. If a node is already present in the multigraph, the graph list (i.e., identifiers of graphs where the node was present) can be added to the already existing node. Edges can be simply appended since an edge can be uniquely identified by four numbers in some embodiments: source node id, target node id, type and graph id. When merging a graph, its graph id is new to the multigraph so there cannot be a duplicate edge in some embodiments.

FIGS. 3 and 4 below provide details on operations performed on the multigraph created as discussed above. In some embodiments, the malware label inferencing and multigraph visualization utilize a value that will be referred to as a "specificity index." The specificity index comprises a number quantifying the relationship between two nodes in a directed multigraph 116. In some embodiments, the specificity index is a value in the range 0 and 1 inclusive. Given a relationship of the form S-E→T (meaning node S has relationship of type E to node T) then node T is said to be "specific to" node S when the node specificity $T_{spec}$ is large. In embodiments where T is in the range of 0-1, large can be a value approaching one. A specific threshold for what is considered large can be provided by the user based on their analysis of the types of subgraphs present in the multigraph. The relationship E from S to T is said to be "specific to" nodes S, T when the edge specificity $E_{spec}$ is large. In embodiments where E is in the range of 0-1, large can be a value approaching one. A specific threshold for what is considered large can be provided by the user based on their analysis of the types of subgraphs present in the multigraph. The formulas below can be used to calculate both specificities $T_{spec}$ and $E_{spec}$:

$$T_{spec} = |T_g \cap S_g| / |T_g|$$

$$E_{spec} = \min(1, E_{sT}/|S_g|)$$

Where:
$E_{sT}$—number of edges between Source and Target node
$S_g$, $T_g$—set of graphs containing Source or Target node respectively FIG. 3 is a flow chart 300 illustrating operations of a method for inferring malware labels and in a multigraph. The method utilizes the specificity index discussed above. In some embodiments, at least one node in the multigraph is known to be malicious (the ground truth). The operations below can be used to find other malicious nodes.

At block 302, a label inference query can be received that initiates a label inferencing.

At block 304, the node scores are initialized. Nodes that are known to represent malware are given a score of one (1). All other nodes are given a score of zero (0).

Block 306 is the top of a loop that iterates over all of the nodes. In some embodiments, the operations within the loop, i.e., blocks 308-310, can be performed for each node during an iteration of the loop. A predetermined or configurable number of iterations can be performed. In some embodiments, 5-7 iterations can be performed, unless a stopping condition is detected as discussed at block 314 below.

At block 308, a check is made to determine if the node score is above a threshold value $T_{spread}$. In some embodiments, $T_{spread}$ can be 0.1. If the node score is not above $T_{spread}$, then the flow proceeds to block 314, where the next node can be processed in the iteration. If the node score is above the threshold $T_{spread}$, then flow proceeds to block 310.

At block 310, the node scores for nodes connected to the current node are updated. In some embodiments, the node scores for the connected nodes are updated according to the following formulas:

$$T_s = \max(T_s, S_s * E_{spec} * T_{spec})$$

Where:
$T_s$—Target node score
$S_s$—Source node score
$E_{spec}$—Edge specificity index of edge connecting Source to Target
$T_{spec}$—Target node specificity index with respect to Source node Block 312 is the bottom of the loop that iterates through all of the nodes. If the predetermined or configurable number of iterations has been performed, then flow proceeds to block 316. Otherwise, flow proceeds to block 314.

At block 314, a check is made to determine if the total score in the whole graph increases by less than a predetermined or configurable threshold when compared to the previous iteration. In some embodiments, the threshold can be $2*T_{sPREAD}$. If the total score has increased less than the threshold, then the iterations are terminated, and the flow proceeds to block 316. Otherwise, the flow returns to the top of the iteration loop at block 308.

At block 316, the multigraph has been completely scored. The scores can be returned as a result of the query received at block 302.

In some embodiments, the method has the following properties:
The score of nodes is always in the range from 0 to 1. A high score can indicate a higher probability that the given node is malicious. Experimentation has determined that nodes with scores of at least 0.5 are likely to be malware.

A score of a node can only grow during the iterations, which means that the order of evaluating nodes is irrelevant, which greatly simplifies the implementation and allows several optimizations. For example, a list of the nodes can be sorted by node score in descending order. Once a node is reached with a node score below a predetermined or configurable threshold, evaluation of the remaining nodes can be stopped since they will also be below threshold. After the current iteration is finished, the nodes can be sorted again for the next iteration. In some embodiments, the order of evaluating nodes is irrelevant (i.e., does not depend on graph structure) so a new order can be chosen in every iteration and still arrive at the correct result. This also simplifies the implementation in another way. Because it is not necessary to traverse the graph according to its structure, it is not necessary to implement a graph traversal algorithm as in conventional systems. Instead, the nodes can be placed in one array and linearly processed.

The algorithm is computationally quite inexpensive when compared to conventional methods since it only touches nodes directly connected to nodes having a non-zero score.

The number of iterations limits how far a malware label can spread. As noted above, some embodiments use a value of 5-7 for the number of iterations, which is sufficient in the vast majority of cases. However, a larger value can be used if necessary.

FIG. 4 is a flow chart 500 illustrating operations of a method for creating a visualization of a large multigraph having malware labels.

At block 402, a request is received to provide a visualization of a multigraph. The request can specify a node (referred to as the "origin") that provides the context for the request.

At block 404, a breadth-first search (BFS) algorithm is run, starting at the origin node. The BFS algorithm is run from the origin node to a specified depth. In some embodiments, the depth can be specified by a user. It can be desirable to select a small depth is selected at first (e.g., a depth of three (3)). If the resulting visualization does not show enough context, the user can rerun it with a higher depth. However, it should be noted that using a big depth is not always desirable since it can result in excessively large subgraphs where it is difficult to find relevant information among all the noise in the graph. Thus, starting at a smaller depth may be better, and if the smaller depth does not provide enough information, the depth can be made larger.

In general, the choice of a depth can depend on the density of the graph and behavior of the nodes studied. In some embodiments, the depth can be limited to a range of 3-10. For example, in cases where the studied node makes a lot of actions directly (e.g., has lots of edges to other nodes) it might be sufficient to use a low depth because it may not be necessary to see far away connections (because there are none or they are irrelevant). However, in many cases, malicious programs use several "proxies" to obscure their tracks. For example, instead of launching a backdoor process directly, malicious software can use several other processes (usually legitimate ones) to do it for them. In this case, using small depth would just reveal these benign nodes (processes). Enlarging the depth allows a user to see further and can reveal the launched backdoor processes in the graph.

Block 406 is the top of a loop that iterates over all reachable nodes. Operations at block 408-412 are executed with respect to a reachable node during an iteration.

At block 408, a check is made to determine if the current node is within the specified depth limit. If the current node is not within the specified depth limit, then flow proceeds to block 414 to consider a next node (if any). If the current node is within the specified depth limit, then flow proceeds to block 410.

At block 410, a node specificity index is determined for the current node with respect to the origin node. Additionally, a connecting edge specificity index is calculated as specified above.

At block 412, the node specificity index and edge specificity index can then be used to determine an opacity value for the node and edge.

Block 414 is the bottom of the loop that iterates over all reachable nodes from the origin node. If nodes remain to be processed, flow returns to block 406. If no nodes remain to be processed, flow proceeds to block 416.

At block 416, all nodes have been processed. A visualization of the subgraph having weighted edges and nodes can be returned to the source of the request made at block 402.

It can be seen from the above that nodes that are completely opaque are very specific to the origin while transparent nodes are more independent of origin (meaning they appear in many other graphs). Similarly, the edge opacity can reveal how specific that edge is for the two nodes it connects, thus it can be relatively easy to see important paths in the graph. Using a malicious node as the origin then has the effect of allowing the user of such a visualization to easily find other potentially malicious nodes. An example of such a weighted directed subgraph is provided in FIG. 5.

Figure 5:
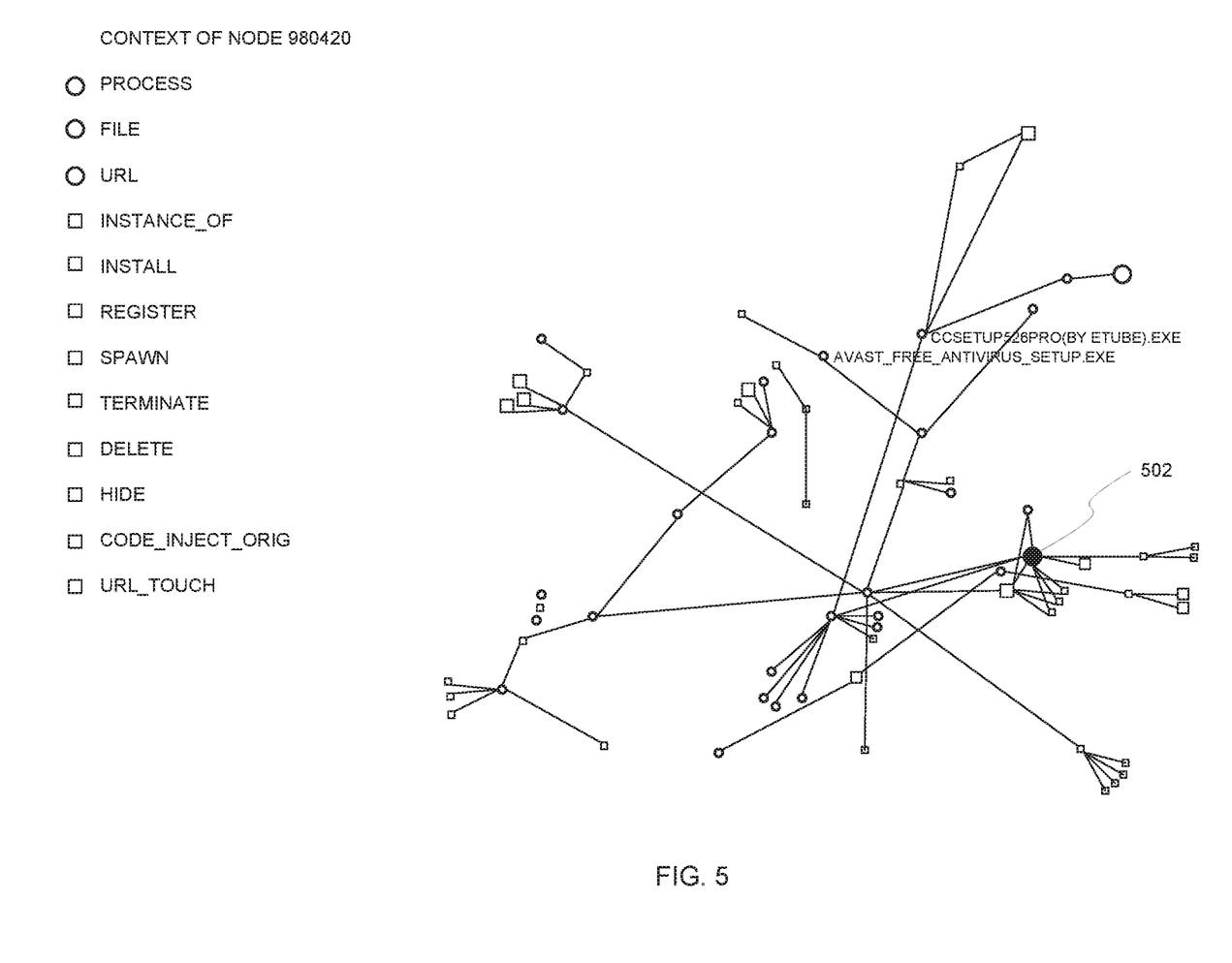
FIG. 5 illustrates an example visualization of a large multigraph.

FIG. 5 illustrates an example visualization 500 of an example subgraph of a large multigraph. The origin node 502 is highlighted as a filled circle (center right). Even though there are hundreds of other nodes and the subgraph is quite large, use of the specificity index as described above makes it relatively easy to pick nodes for further evaluation (candidates that might be malware) just by looking at the visualization.

It should be noted that while the above-described systems and methods have been described in the context inferring malware from using graph data determined from behavior logs, the inventive subject matter is not limited to such environments. For example, the above-described systems and methods may be applied to any data set from which a set of nodes and edges can be determined. Further, the above-described systems and methods may be applied to any environment that processes graphs with a large number of nodes to determine a score for the nodes.

Figure 6:
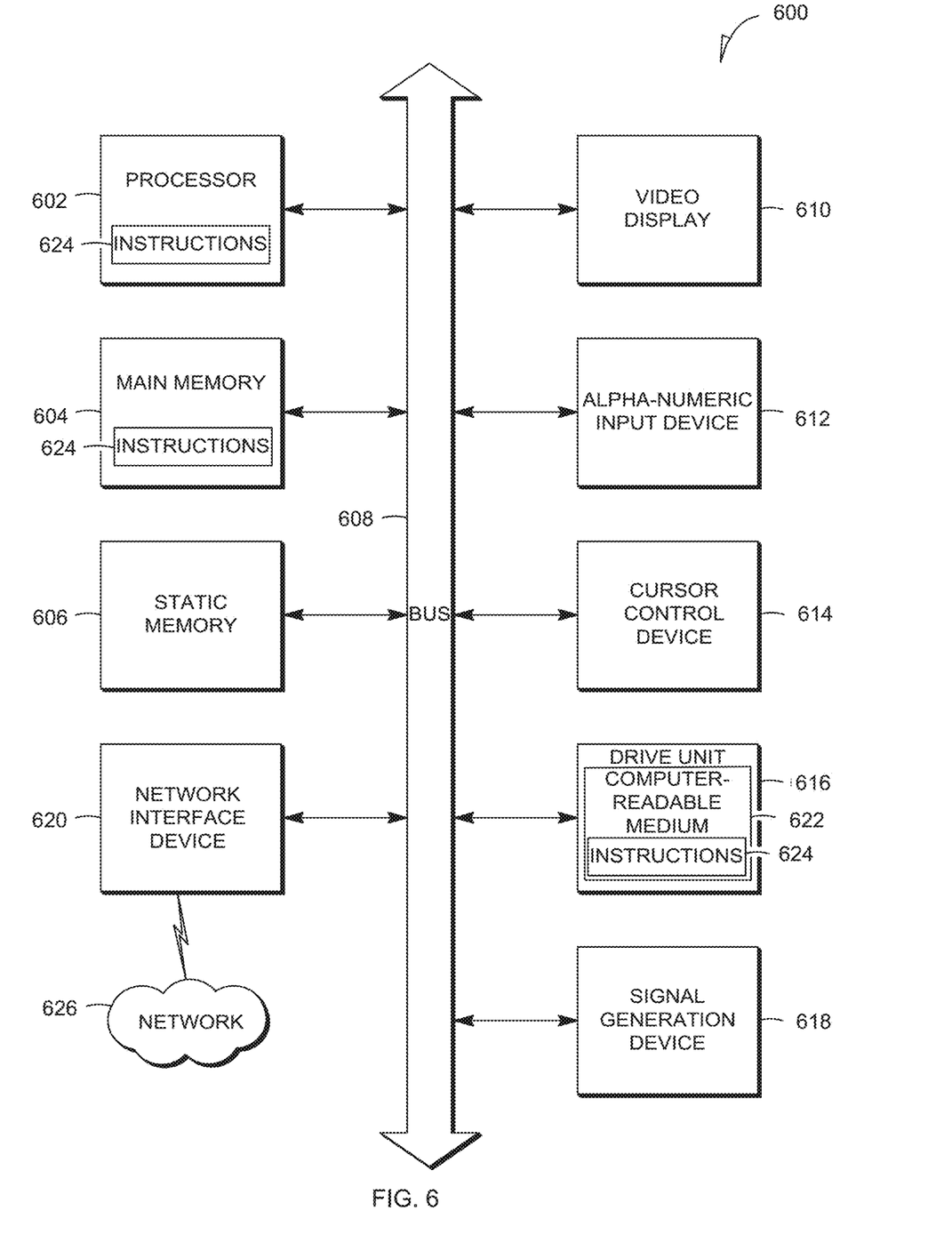
FIG. 6 is a block diagram of an example embodiment of a computer system upon which embodiments of the inventive subject matter can execute.

FIG. 6 is a block diagram of an example embodiment of a computer system 600 upon which embodiments of the inventive subject matter can execute. The description of FIG. 6 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 6 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a signal transmission medium via the network interface device 620 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter.

What is claimed is:

1. A method for malware label inference and visualization in a multigraph, the method comprising:
   determining a graph having a first plurality of nodes from a data set;
   merging the graph into a multigraph having a second plurality of nodes;
   the nodes including a source node and target nodes; and
   iterating over the second plurality of nodes, and in response to determining that a current source node for an iteration has a node score that is above a threshold, performing operations comprising:
      for each target node connected via an edge to the source node, determining one or more specificity indexes for the target node, wherein the one or more specificity indexes include a node specificity index and wherein determining the node specificity index comprises determining the node specificity index according to a formula $$T_{spec} = |T_g \cap S_g|/|T_g|,$$

wherein $T_{spec}$ comprises the node specificity index, $S_g$ comprises a first set of graphs containing the source node, and $T_g$ comprises a second set of graphs containing the target node;
      determining a node score and a label indicative of the likelihood of detected malware for the target node based, at least in part, on the one or more specificity indexes; and
      presenting a visualization of the second plurality of nodes and labels to a user to allow identification of potential malware.

2. A method for evaluating a multigraph, the method comprising:
   determining a graph having a first plurality of nodes from a data set;
   merging the graph into a multigraph having a second plurality of nodes;
   the nodes including a source node and target nodes; and
   iterating over the second plurality of nodes, and in response to determining that a current source node for an iteration has a node score that is above a threshold, performing operations comprising:
   for each target node connected via an edge to the source node, determining one or more specificity indexes for the target node, wherein the one or more specificity indexes include an edge specificity index and wherein determining the edge specificity index comprises determining the edge specificity index according to a formula $$E_{spec} = \min(1, E_{ST}/|S_g|),$$

wherein $E_{spec}$ comprises the edge specificity index, $S_g$ comprises a first set of graphs containing the source node, and $E_{ST}$ comprises a number of edges between the source node and the target node;
      determining a node score and a label indicative of the likelihood of detected malware for the target node based, at least in part, on the one or more specificity indexes; and
      presenting a visualization of the second plurality of nodes and labels to a user to allow identification of potential malware.

3. A method for evaluating a multigraph, the method comprising:
   determining a graph having a first plurality of nodes from a data set;
   merging the graph into a multigraph having a second plurality of nodes;
   the nodes including a source node and target nodes; and
   iterating over the second plurality of nodes, and in response to determining that a current source node for an iteration has a node score that is above a threshold, performing operations comprising:
   for each target node connected via an edge to the source node, determining one or more specificity indexes for the target node, wherein the one or more specificity indexes include a node specificity index and an edge specificity index, and wherein determining the node score includes determining the node score according to a formula $$T_s = \max(T_s, S_s * E_{spec} * T_{spec}),$$

wherein $T_s$ comprises the node score, $S_s$ comprises the source node score, $E_{spec}$ comprises the edge specificity index of an edge connecting the source node to the target node, and $T_{spec}$ comprises the node specificity index of the target node with respect to the source node;
      determining a node score and a label indicative of the likelihood of detected malware for the target node based, at least in part, on the one or more specificity indexes; and
      presenting a visualization of the second plurality of nodes and labels to a user to allow identification of potential malware.

4. A non-transitory machine-readable medium having instructions stored thereon, the instructions comprising computer executable instructions that when executed, cause one or more processors to:
   determine a graph having a first plurality of nodes from a data set;
   merge the graph into a multigraph having a second plurality of nodes; and
   iterate over the second plurality of nodes, and in response to determining that a current source node for an iteration has a node score that is above a threshold, performing operations comprising:
   for each target node connected via an edge to the source node, determine one or more specificity indexes for the target node, wherein the one or more specificity indexes include a node specificity index and an edge specificity index, and wherein the node score is determined according to a formula $$Ts = \max(T_s, S_s * E_{spec} * T_{spec}),$$

wherein $T_s$ comprises the node score, $S_s$ comprises the source node score, $E_{spec}$ comprises the edge specificity index of an edge connecting the source node to the target node, and $T_{spec}$ comprises the node specificity index of the target node with respect to the source node;

determine a node score and a label indicative of the likelihood of detected malware for the target node based, at least in part, on the one or more specificity indexes; and present a visualization of the second plurality of nodes and labels to a user to allow identification of potential malware.

5. A non-transitory machine-readable medium having instructions stored thereon, the instructions comprising computer executable instructions that when executed, cause one or more processors to:

determine a graph having a first plurality of nodes from a data set;

merge the graph into a multigraph having a second plurality of nodes; and iterate over the second plurality of nodes, and in response to determining that a current source node for an iteration has a node score that is above a threshold, performing operations comprising:

for each target node connected via an edge to the source node, determine one or more specificity indexes for the target node, wherein the one or more specificity indexes include a node specificity index and wherein the node specificity index is determined according to a formula $T_{spec} = |T_g \cap S_g|/|T_g|$, wherein $T_{spec}$ comprises the node specificity index, $S_g$ comprises a first set of graphs containing the source node, and $T_g$ comprises a second set of graphs containing the target node;

determine a node score and a label indicative of the likelihood of detected malware for the target node based, at least in part, on the one or more specificity indexes; and present a visualization of the second plurality of nodes and labels to a user to allow identification of potential malware.

6. A non-transitory machine-readable medium having instructions stored thereon, the instructions comprising computer executable instructions that when executed, cause one or more processors to:

determine a graph having a first plurality of nodes from a data set;

merge the graph into a multigraph having a second plurality of nodes; and iterate over the second plurality of nodes, and in response to determining that a current source node for an iteration has a node score that is above a threshold, performing operations comprising:

for each target node connected via an edge to the source node, determine one or more specificity indexes for the target node wherein the one or more specificity indexes include an edge specificity index; wherein the edge specificity index is determined according to a formula $E_{spec} = \min(1, E_{ST}/|S_g|)$, wherein $E_{spec}$ comprises the edge specificity index, $S_g$ comprises a first set of graphs containing the source node, and $E_{ST}$ comprises a number of edges between the source node and the target node;

determine a node score and a label indicative of the likelihood of detected malware for the target node based, at least in part, on the one or more specificity indexes; and present a visualization of the second plurality of nodes and labels to a user to allow identification of potential malware.

7. An apparatus comprising:

one or more processors; and a non-transitory machine-readable medium having computer executable instructions stored thereon, that when executed, cause the one or more processors to:

determine a graph having a first plurality of nodes from a data set;

merge the graph into a multigraph having a second plurality of nodes; and iterate over the second plurality of nodes, and in response to determining that a current source node for an iteration has a node score that is above a threshold, performing operations comprising:

for each target node connected via an edge to the source node, determine one or more specificity indexes for the target node, wherein the one or more specificity indexes include a node specificity index and wherein the node specificity index is determined according to a formula $T_{spec} = |T_g \cap S_g|/|T_g|$, wherein $T_{spec}$ comprises the node specificity index, $S_g$ comprises a first set of graphs containing the source node, and $T_g$ comprises a second set of graphs containing the target node;

determine a node score and a label indicative of the likelihood of detected malware for the target node based, at least in part, on the one or more specificity indexes; and present a visualization of the second plurality of nodes and labels to a user to allow identification of potential malware.

8. An apparatus comprising:

one or more processors; and a non-transitory machine-readable medium having computer executable instructions stored thereon, that when executed, cause the one or more processors to:

determine a graph having a first plurality of nodes from a data set;

merge the graph into a multigraph having a second plurality of nodes; and iterate over the second plurality of nodes, and in response to determining that a current source node for an iteration has a node score that is above a threshold, performing operations comprising:

for each target node connected via an edge to the source node, determine one or more specificity indexes for the target node wherein the one or more specificity indexes include an edge specificity index, and wherein the edge specificity index is determined according to a formula $E_{spec} = \min(1, E_{ST}/|S_g|)$, wherein $E_{spec}$ comprises the edge specificity index, $S_g$ comprises a first set of graphs containing the source node, and $E_{ST}$ comprises a number of edges between the source node and the target node;

determine a node score and a label indicative of the likelihood of detected malware for the target node based, at least in part, on the one or more specificity indexes; and present a visualization of the second plurality of nodes and labels to a user to allow identification of potential malware.

9. An apparatus comprising:

one or more processors; and a non-transitory machine-readable medium having computer executable instructions stored thereon, that when executed, cause the one or more processors to:

determine a graph having a first plurality of nodes from a data set;

merge the graph into a multigraph having a second plurality of nodes; and iterate over the second plurality of nodes, and in response to determining that a current source node for an iteration has a node score that is above a threshold, performing operations comprising:

for each target node connected via an edge to the source node, determine one or more specificity indexes for the target node wherein the one or more specificity indexes include a node specificity index and an edge specificity index, and wherein the node score is determined according to a formula $$Ts = \max(T_s, S_s * E_{spec} * T_{spec}),$$

wherein $T_s$ comprises the node score, $S_s$ comprises the source node score, $E_{spec}$ comprises the edge specificity index of an edge connecting the source node to the target node, and $T_{spec}$ comprises the node specificity index of the target node with respect to the source node;

determine a node score and a label indicative of the likelihood of detected malware for the target node based, at least in part, on the one or more specificity indexes; and present a visualization of the second plurality of nodes and labels to a user to allow identification of potential malware.

* * * * *